(12) United States Patent
Nakamizo et al.

(10) Patent No.: US 9,100,434 B2
(45) Date of Patent: Aug. 4, 2015

(54) WEB PAGE FALSIFICATION DETECTION APPARATUS AND STORAGE MEDIUM

(71) Applicants: KABUSHIKI KAISHA TOSHIBA, Minato-ku (JP); TOSHIBA SOLUTIONS CORPORATION, Minato-ku (JP)

(72) Inventors: Takanori Nakamizo, Chofu (JP); Kenji Kojima, Fuchu (JP); Ikuya Odahara, Kawasaki (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 1 day.

(21) Appl. No.: 13/935,840

(22) Filed: Jul. 5, 2013

(65) Prior Publication Data

US 2013/0298233 A1 Nov. 7, 2013

Related U.S. Application Data

(63) Continuation of application No. PCT/JP2011/080318, filed on Dec. 27, 2011.

(30) Foreign Application Priority Data

Jan. 5, 2011 (JP) ................. 2011-000500

(51) Int. Cl.
*H04L 29/06* (2006.01)
*G06F 21/64* (2013.01)

(52) U.S. Cl.
CPC ............ *H04L 63/1483* (2013.01); *G06F 21/64* (2013.01)

(58) Field of Classification Search
CPC ............ H04L 63/1483; H04L 63/1433; H04L 63/1441; G06F 21/64
USPC ...................................... 726/22, 23
See application file for complete search history.

(56) References Cited

U.S. PATENT DOCUMENTS

2001/0044820 A1* 11/2001 Scott ............................ 709/202
2003/0084299 A1* 5/2003 Tamura et al. ................ 713/181

(Continued)

FOREIGN PATENT DOCUMENTS

CN 101599118 A 12/2009
CN 101795276 A 8/2010

(Continued)

OTHER PUBLICATIONS

Charles Reis, et al., "Detecting In-Flight Page Changes with Web Tripwires", USENIX Symposium on Networked Systems Design and Implementation, 2008, pp. 31-44.

(Continued)

*Primary Examiner* — Matthew Smithers
(74) *Attorney, Agent, or Firm* — Oblon, McClelland, Maier & Neustadt, L.L.P.

(57) ABSTRACT

According to one embodiment, a Web page falsification detection apparatus, a dynamic information falsification determination module determines whether extracted dynamic information corresponds to dynamic characteristic information, and extracts a plurality of static information items. A second generation module couples the extracted static information items, and generates second static characteristic information. A static information falsification determination module determines whether first static characteristic information matches with the generated second static characteristic information, and transmits the Web page information to a user terminal.

3 Claims, 6 Drawing Sheets

(56) References Cited

U.S. PATENT DOCUMENTS

2009/0077383 A1* 3/2009 de Monseignat et al. ..... 713/175
2010/0235910 A1* 9/2010 Ku et al. ..................... 726/22
2013/0263272 A1* 10/2013 Banerjee et al. .............. 726/25

FOREIGN PATENT DOCUMENTS

| JP | 2002-149496 A | 5/2002 |
| JP | 2004-38272 A | 2/2004 |
| JP | 2008-165292 A | 7/2008 |

OTHER PUBLICATIONS

Office Action issued Jan. 29, 2015 in Chinese Patent Application No. 201180054227.9 (with English translation).

Peipei Yuan, et al., "The Peculiarity, Realization and Prevention of SQL Injection Attacks", Research and Development of World Science and Technology, vol. 30, No. 3, Jun. 30, 2008, pp. 290-291.

Huil Kong, et al., "Detection and Recovery Mechanism of Web Tamper with High Performance", 2010 Proceedings of National Meeting for Communication Safety, Aug. 7, 2010, pp. 256-262.

* cited by examiner

```
<HTML>
<BODY>
<H3>Calculation result :
<!-START-DYNAMIC id=0001 min_length=1 max_length=1 type=int -->
n
<!-END-DYNAMIC>
</H3>
<H3>End display</H3>
</BODY>
<HTML>
``` ht

FIG. 2

```
<HTML>
<BODY>
<%@ page language="java"contentType="text/html; charset=Windows-31J"%>
<%-- Declare variable x --%>
<%! Int x = 10 ; %>
<%-- Display x --%>
<H3>Calculation result :
<!-START-DYNAMIC id=0001 min_length=1 max_length=1 type=int -->
<%= x %>
<!-END-DYNAMIC>
</H3>
<H3>End display</H3>
</BODY>
<HTML>
``` pr

FIG. 3

```
<HTML>
<BODY>
<%@ page language="java"contentType="text/html; charset=Windows-31J"%>
<%-- Declare variable s --%>
<%! String s = "test";% >
<%-- Display s --%>
<H3>Calculation result :
<%=s %>
</H3>
<H3>End display</H3>
</BODY>
<HTML>
``` pr'

FIG. 6

```
<HTML>                          (1) Target part for static falsification checking
<BODY>                               processing
<%@ page language="java"contentType="text/html; charset=Windows-31J"%>
<%-- Declare variable s --%>
<%! String s = "test"; %>
<%-- Display s --%>                (2) Target part for static falsification checking
<H3>Calculation result :              processing
<!-START-DYNAMIC id=0002 min_length=4 max_length=4 type=string regex=t.*t -->
<%=s %>                          Target part for dynamic falsification checking
<!-END-DYNAMIC>                      processing
</H3>
<H3>End display</H3>              (3) Target part for static falsification checking
</BODY>                               processing
<HTML>
``` pr

FIG. 7

WEB PAGE FALSIFICATION DETECTION APPARATUS AND STORAGE MEDIUM

CROSS REFERENCE TO RELATED APPLICATIONS

This application is a Continuation Application of PCT Application No. PCT/JP2011/080318, filed Dec. 27, 2011 and based upon and claiming the benefit of priority from Japanese Patent Application No. 2011-000500, filed Jan. 5, 2011, the entire contents of all of which are incorporated herein by reference.

FIELD

Embodiments described herein relate generally to a Web page falsification detection apparatus and a storage medium.

BACKGROUND

With development of techniques for the Internet, various businesses and services have been provided by Web applications and Web pages, which can be easily used by using a Web (World Wide Web) browser. For example, shopping services are provided by displaying Web pages which introduce products on a user terminal to promote the user to select and order a product, settling the bill for the ordered product by the Web application by using a credit card number or the like, and delivering the product by a door-to-door delivery service. Users can enjoy various services, by using Web applications and Web pages.

On the other hand, such Web pages are frequently falsified, for example, a code to lead the user to a malicious Web page is embedded in the Web pages. Managers of Web pages are required to detect such falsifications early, and techniques of detecting Web-page falsifications have an increasing importance.

The Web-page falsification detection techniques include a technique of detecting falsification of a Web page, by calculating and storing characteristic information of the Web page in a storage module in advance, and comparing characteristic information of the Web page obtained directly before transmission with the characteristic information stored in advance in the storage module when the Web page is transmitted in response to a user's request.

In addition, there is a technique of detecting falsification of the Web page, in which the size of change in the Web page is used as an index, and it is determined that the Web page has been falsified, when change in the Web page is large.

BRIEF DESCRIPTION OF THE DRAWINGS

FIG. 2 is a schematic diagram illustrating an example of Web page information to display a Web page in the embodiment.

FIG. 3 is a schematic diagram illustrating an example of a program configured to generate Web page information to be subjected to falsification checking processing in the embodiment.

FIG. 6 is a schematic diagram illustrating an example of a Web page generation program before the comment information is embedded in the embodiment.

FIG. 7 is a schematic diagram illustrating an example of the Web page generation program after the comment information is embedded in the embodiment.

DETAILED DESCRIPTION

Figure 1:
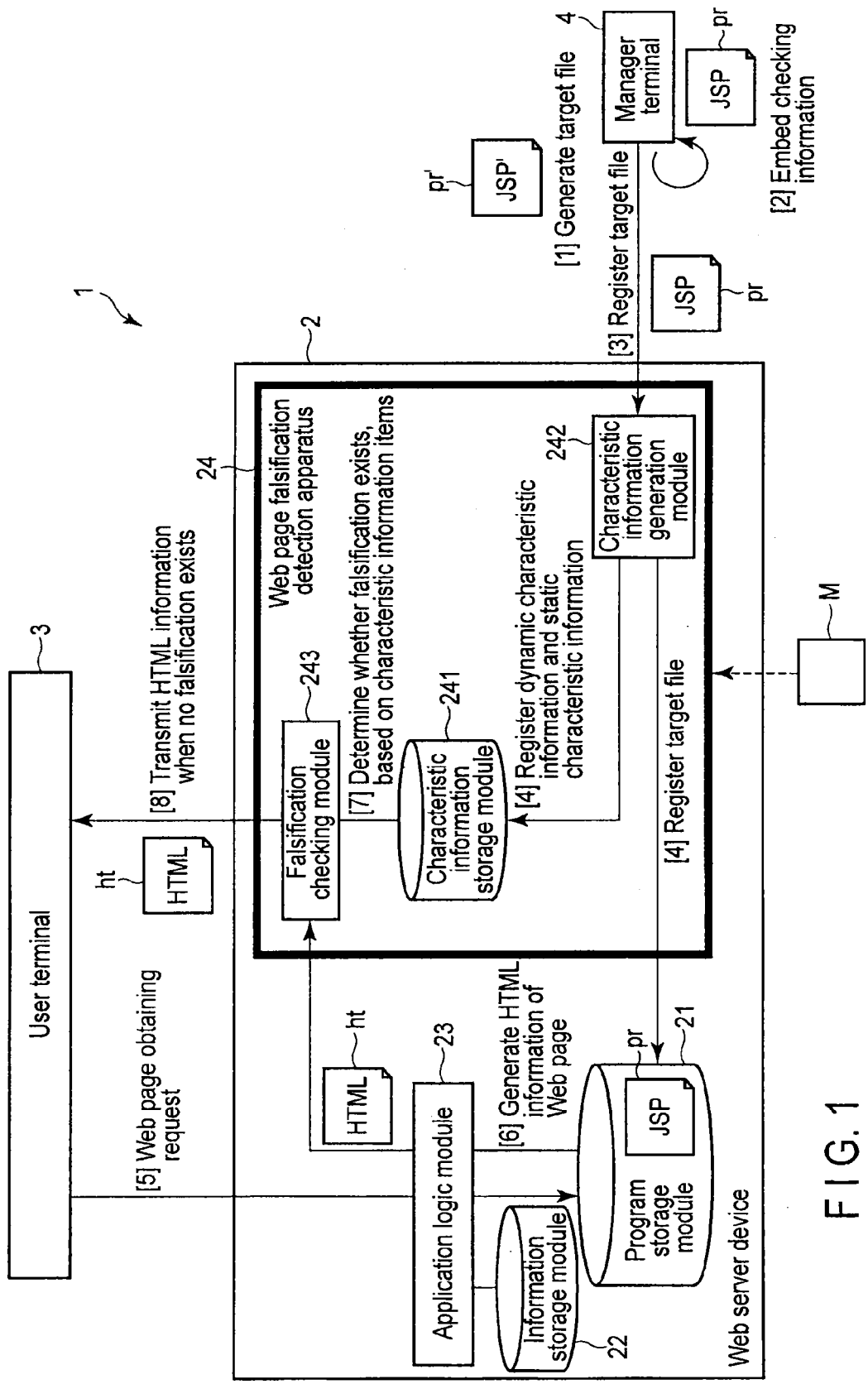
FIG. 1 is a schematic diagram illustrating an example of configuration of a Web page falsification detection system including a Web page falsification detection apparatus according to an embodiment.

In general, according to one embodiment, a Web page falsification detection apparatus is provided in a Web server device including an application logic module capable of communicating with a user terminal which displays a Web page. The Web page falsification detection apparatus includes a characteristic information storage module, is capable of communicating with a manager terminal, and executes falsification checking processing for Web page information to display the Web page on the user terminal.

The Web page falsification detection apparatus comprises a first extraction module, a dynamic characteristic information extraction module, a second extraction module, a first generation module, a first writing module, a second writing module, a third extraction module, a dynamic information falsification determination module, a fourth extraction module, a second generation module, a static information falsification determination module, and a transmitting module.

The first extraction module receives a Web page generation program configured to generate the Web page information and including a dynamic information calculation program configured to calculate dynamic information to display a changed part in the Web page, comment information including dynamic characteristic information indicating a characteristic including a range of change of the dynamic information, and a plurality of static information items to display an unchanged part in the Web page, and extracts the comment information from the received Web page generation program.

The dynamic characteristic information extraction module extracts the dynamic characteristic information from the extracted comment information.

The second extraction module extracts the static information generation programs from the received Web page generation program.

The first generation module couples the extracted static information items, and generates first static characteristic information that indicates a characteristic of the static information, based on the coupled static information and function information that indicates a predetermined unidirectional function.

The first writing module correlates the extracted dynamic characteristic information with the generated first static characteristic information, and writes the correlated information items in the characteristic information storage module.

The second writing module writes the received Web page generation program in a storage module in the Web server device.

The third extraction module extracts the dynamic information from Web page information transmitted from the application logic module. The Web page information is generated from the Web page generation program in the storage module by the application logic module which has received a Web page obtaining request from the user terminal, and includes the dynamic information, the comment information, and the static information items.

The dynamic information falsification determination module determines whether the extracted dynamic information corresponds to the dynamic characteristic information stored in the characteristic information storage module.

The fourth extraction module extracts the static information items from the transmitted Web page information, when a result of determination by the dynamic information falsification determination module indicates that the dynamic information corresponds to the dynamic characteristic information.

The second generation module couples the extracted static information items, and generates second static characteristic information that indicates a characteristic of the coupled static information, based on the coupled static information and the function information.

The static information falsification determination module determines whether the first static characteristic information stored in the characteristic information storage module matches with the generated second static characteristic information.

The transmission module transmits the transmitted Web page information to the user terminal, when a result of determination by the static information falsification determination module indicates that the first static characteristic information matches with the generated second static characteristic information.

An embodiment will be explained hereinafter with reference to drawings. A Web page falsification detection apparatus described hereinafter can be carried out with either of hardware and a combination of hardware resource and software. As software of the combination, there is a program that is installed in a computer from a network or a non-transitory computer-readable storage medium M, executed by a processor of the computer, and thereby causes the computer to perform the function of the Web page falsification detection apparatus.

Figure 4:
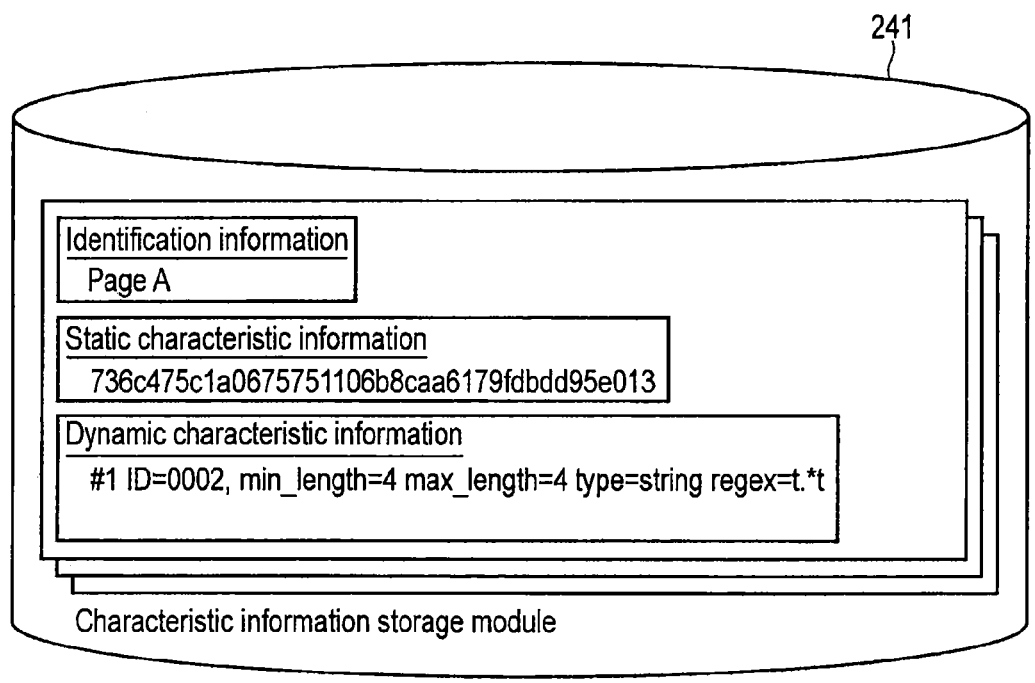
FIG. 4 is a schematic diagram illustrating an example of information stored in a characteristic information storage module in the embodiment.

FIG. 1 is a schematic diagram illustrating an example of configuration of a Web page falsification detection system including the Web page falsification detection apparatus according to the embodiment. FIG. 2 is a schematic diagram illustrating an example of Web page information to display a Web page in the embodiment. FIG. 3 is a schematic diagram illustrating an example of a program configured to generate Web page information to be subjected to falsification checking processing in the embodiment. FIG. 4 is a schematic diagram illustrating an example of information stored in a characteristic information storage module in the embodiment.

In the Web page falsification detection system 1, a Web server device 2 connects with a user terminal 3 and a manager terminal 4 through, for example, a network. As illustrated in FIG. 2, the user terminal 3 includes any Web browser configured to enable browsing of Web page information, such as Hypertext Markup Language (HTML) information ht which is transmitted from the Web server device 2. The manager terminal 4 executes processing of transmitting a Web page generation program pr to the Web server device 2. As illustrated in FIG. 3, the Web page generation program pr is configured to generate Web page information, and includes dynamic information calculation program (the line with the head "<%") configured to calculate dynamic information for displaying a changed part in the Web page, comment information (the line with the head "<!") including dynamic characteristic information indicating a characteristic that includes a range of change of the dynamic information, and a plurality of static information items for displaying unchanged parts in the Web page. The Web page generation program pr transmitted from the manager terminal 4 to the Web server device 2 is required to include in advance start comment information indicating a start line of a source code of the dynamic information calculated by the dynamic information calculation program, and end comment information indicating an end line of the source code of the dynamic information calculated by the dynamic information calculation program, by using HTML comments "<!- - - ->" as illustrated in FIG. 3. Since the start comment information and the end comment information are embedded by using HTML comments "<!- - - ->", it is possible to designate the position of the source code of the dynamic information, without any influence on operation of the Web server device 2.

Although the present embodiment uses one dynamic information calculation program existing in the Web page generation program pr, the embodiment is not limited to it. For example, it is possible to use Web page generation program pr including a plurality of dynamic information calculation programs. In addition, although the Web page generation program pr transmitted from the manager terminal 4 to the Web server device 2 is generated by using Java (registered trademark) Server Pages (JSP) in the present embodiment, the embodiment is not limited to it. In the same manner, although the present embodiment shows the case of using HTML information as Web page information, the embodiment is not limited to it. For example, another type of information such as Extensible Markup Language (XML) information can be used.

As illustrated in FIG. 1, the Web server device 2 includes a program storage module 21, an information storage module 22, an application logic module 23, and a Web page falsification detection apparatus 24. The program storage module 21 stores the Web page generation program pr transmitted from the Web page falsification detection apparatus 24. The information storage module 22 stores information required for calculating dynamic information from the Web page generation program pr. The information storage module 22 also stores, for example, user management information required for user authentication and credit card debt settlement in a Web page for shopping service. The information storage module 22 also stores HTML information for displaying an error picture on the user terminal 3 when falsification is detected as a result of falsification checking processing in the falsification detection apparatus 24. The application logic module 23 executes processing of generating Web page information from the Web page generation program pr in the program storage module 21, in response to a Web page obtaining request received from the user terminal 3. The application logic module 23 also executes processing of transmitting the generated Web page information to the Web page falsification detection apparatus 24, to execute falsification checking processing.

On the other hand, as illustrated in FIG. 1, the Web page falsification detection apparatus 24 includes a characteristic information storage module 241, a characteristic information generation module 242, and a falsification checking module 243.

As illustrated in FIG. 4, the characteristic information storage module 241 stores identification information for identifying the Web page information generated by the Web page generation program pr, dynamic characteristic information extracted from the Web page generation program pr, and first static characteristic information generated from the static information items in the Web page generation program pr and indicating characteristics of the static information items, in correlation with each other. The identification information may be omitted, when there is only one Web page information item generated by the Web page generation program pr.

Specifically, the identification information indicates a name (page name) of the Web page information generated by the Web page generation program pr. As the identification information, for example, it is possible to use any desired character string, which can be prepared based on the Web page generation program pr, such as a file name (excluding the extension) in the Web page generation program pr, and a title name held between the title tags of the generated Web page information. The dynamic characteristic information indicates, for example, the minimum length (minimum value of the change) of the dynamic information, the maximum length (maximum value of the change) of the dynamic information, the type of the dynamic information, regular expression of the dynamic information, and ID for identifying the dynamic information. In addition, the first static characteristic information indicates a hash value, which is calculated based on function information that indicates a unidirectional function, such as a hash function, from the static information items in the Web page generation program pr.

Although falsification checking processing is executed for one Web page information item in the present embodiment, falsification checking processing may be performed for a plurality of Web page information items. In such a case, the characteristic information storage module 241 stores identification information, dynamic characteristic information, and first static characteristic information in correlation with each other, for each Web page information item generated by the Web page generation program pr.

When the characteristic information generation module 242 receives the Web page generation program pr configured to generate Web page information from the manager terminal 4, the characteristic information generation module 242 extracts dynamic characteristic information from the received Web page generation program pr, and executes processing of generating first static characteristic information. Specifically, the characteristic information generation module 242 has the following functions (f242-1) to (f242-6).

(f242-1) A function of extracting comment information from Web page generation program pr that is configured to generate Web page information and includes the dynamic information calculation program to calculate dynamic information for displaying a changed part in the Web page, the comment information including dynamic characteristic information indicating characteristics including a range of change in the dynamic information, and the static information generation program to generate static information items for displaying an unchanged part in the Web page, when the Web page generation program pr is received from the manager terminal 4.

(f242-2) A dynamic characteristic information extraction function of extracting the dynamic characteristic information from the extracted comment information.

The comment information may include information (for example, min_Length=4 max_Length=4) that includes the maximum value and the minimum value of change in the dynamic information. The comment information may be formed of start comment information indicating the start line of the source code of the dynamic information and end comment information indicating the end line of the source code of the dynamic information. In addition, the dynamic characteristic information extraction function (f242-1) may include a function of extracting the information which includes the maximum value and the minimum value of change in the dynamic information from the comment information, as the dynamic characteristic information. The dynamic characteristic information extraction function (f242-1) may include a function of extracting the information which includes the maximum value and the minimum value of change in the dynamic information and is included in the comment information, as the dynamic characteristic information.

(f242-3) A function of extracting the static information items from the received Web page generation program pr.

(f242-4) A function of coupling the extracted static information items, and generating first static characteristic information indicating a characteristic of the static information, based on the coupled static information and function information indicating a predetermined unidirectional function.

(f242-5) A function of correlating the extracted dynamic characteristic information with the generated first static characteristic information, and writing them in the characteristic information storage module 241.

(f242-6) A function of writing the received Web page generation program pr in the program storage module 21 in the Web server device 2. The identification information for identifying the Web page information may be correlated with the Web page generation program pr and written in the program information storage module 21.

The falsification checking module 243 executes falsification checking processing for the Web page information generated in the application logic module 23 in the Web server device 2, based on the dynamic characteristic information and the first static characteristic information stored in the characteristic information storage module 241. Specifically, the falsification checking module 243 has the following functions (f243-1) to (f243-6).

(f243-1) A function of extracting dynamic information (the line of n in the example of FIG. 2) from Web page information transmitted from the application logic module 23, when the Web page information including the dynamic information, comment information and static information items is generated from the Web page generation program pr in the program storage module 21 by the application logic module 23 that has received a Web page obtaining request from the user terminal 3, and the Web page information is transmitted from the application logic module 23.

(f243-2) A dynamic information falsification determination function of determining whether the extracted dynamic information corresponds to the dynamic characteristic information stored in the characteristic information storage module 241. When the identification information is used in the characteristic information storage module 241, the characteristic information storage module 241 is searched based on the page name of the Web page information generated by the application logic module 23, the dynamic characteristic information correlated with the identification information that matches with the page name is read out from the characteristic information storage module 241, and the dynamic characteristic information is used for determination.

(f243-3) A function of extracting the static information items (other than the dynamic information (the line of n in the example of FIG. 2) and the comment information (the line with the head "<!" in the example of FIG. 2)) from the transmitted Web page information, when a result of determination by the dynamic information falsification determination function indicates that the dynamic information items correspond to each other.

(f243-4) A function of coupling the extracted static information items, and generating second static characteristic information indicating a characteristic of the coupled static information, based on the coupled static information and the unidirectional function information.

(f243-5) A static information falsification determination function of determining whether the first static characteristic information stored in the characteristic information storage module 241 matches with the generated second static characteristic information.

(f243-6) A function of transmitting the transmitted Web page information to the user terminal 3, when a result of determination by the static information falsification determination function indicates that they match with each other.

Figure 5:
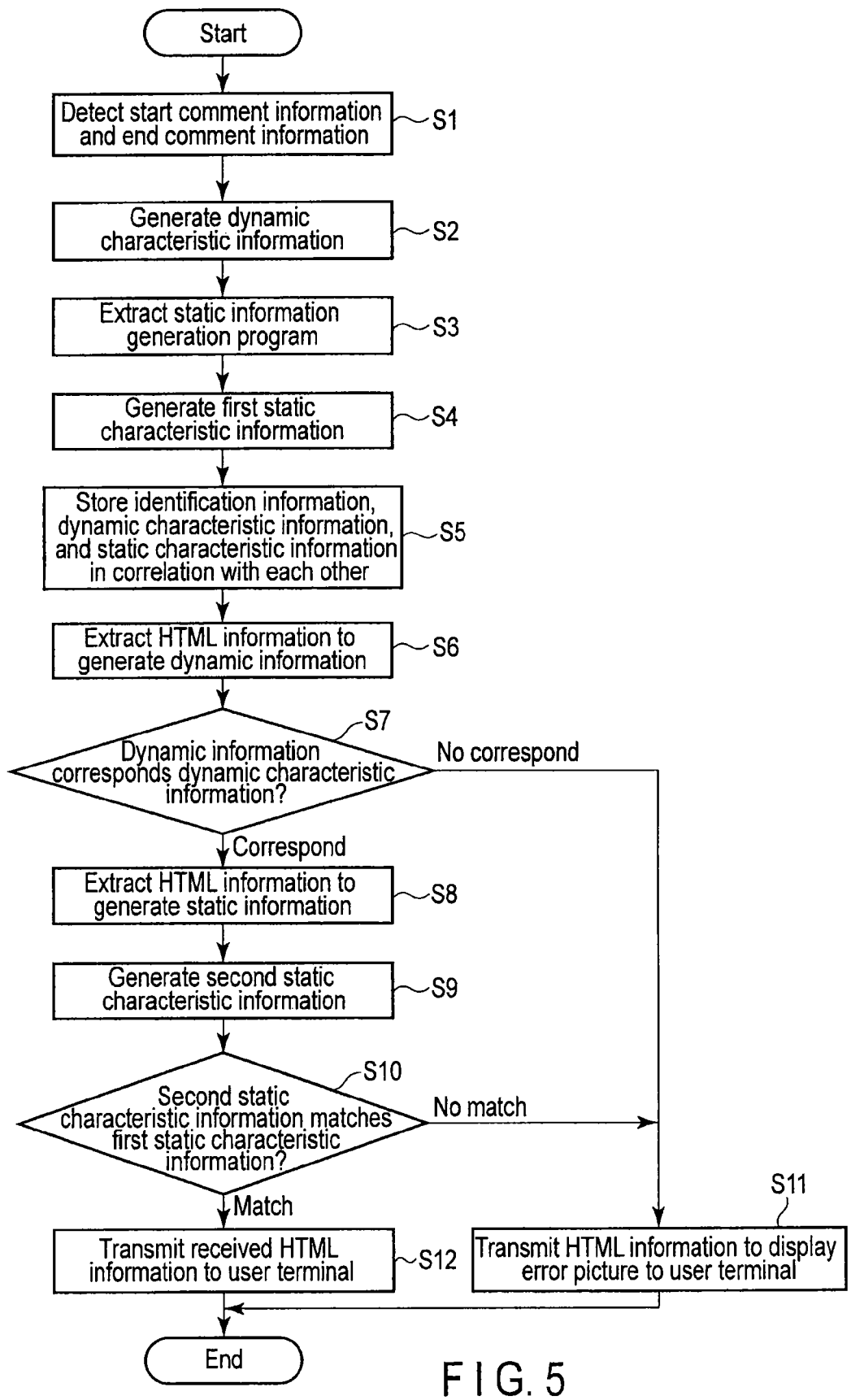
FIG. 5 is a flowchart illustrating an example of operation of the Web page falsification detection system in the embodiment.
Figure 8:
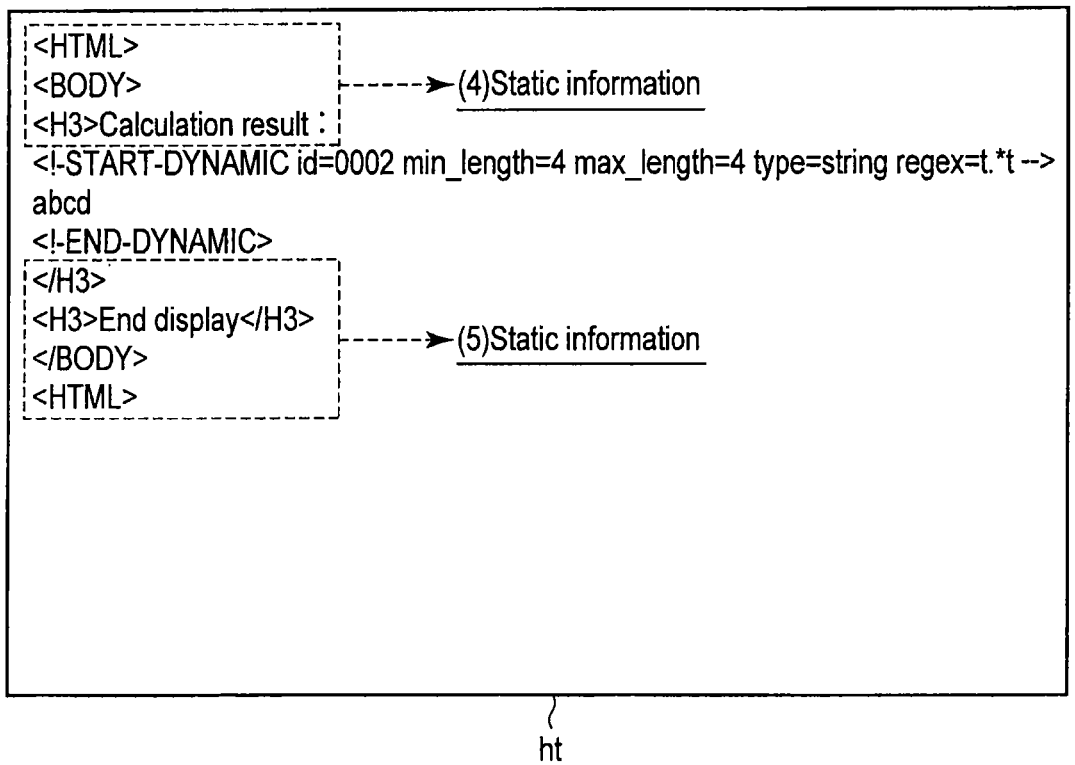
FIG. 8 is a schematic diagram illustrating an example of Web page information to be subjected to falsification checking processing in the embodiment.

Next, operation of the Web page falsification detection system structured as described above will be explained hereinafter with reference to the flowchart of FIG. 5 and schematic diagrams of FIG. 6 to FIG. 8. The following explanation shows the case where the Web page generation program pr as illustrated in FIG. 7 is transmitted from the manager terminal 4 to the Web page falsification detection apparatus 24 in the Web server device 2. Suppose that the Web page information is HTML information ht as illustrated in FIG. 8.

As preparation, as illustrated in [1] to [3] of FIG. 1, the manager terminal 4 generates a target file (for example, a JSP file) formed of the Web page generation program pr', as illustrated in FIG. 6, by manager's operation. Next, the manager terminal 4 embeds start comment information and end comment information as checking information for checking falsification in the Web page generation program pr' by manager's operation, and thereby generates the Web page generation program pr as illustrated in FIG. 7.

Thereafter, the manager terminal 4 transmits the Web page generation program pr to the Web page falsification detection apparatus 24. Hereinafter, operation indicated by [4] to [8] of FIG. 1 will be explained with reference to FIG. 5, FIG. 7, and FIG. 8.

Specifically, when the characteristic information generation module 242 receives the Web page generation program pr transmitted from the manager terminal 4, the characteristic information generation module 242 extracts the start comment information "<!-START-DYNAMIC id=0002 min_length=4 max_length=4 type=string regex=t.*t→>" and the end comment information "<!-END-DYNAMIC>" from the Web page generation program pr, as illustrated in FIG. 7 (Step S1).

Then, the characteristic information generation module 242 extracts the information "id=0002 min_length=4 max_length=4 type=string regex=t.*t" included in the start comment information extracted at Step S1, as dynamic characteristic information (Step S2).

Thereafter, the characteristic information generation module 242 extracts a plurality of static information items: (1) "<HTML><BODY>"; (2) "<H3> Calculation result:"; and (3) "</H3><H3> End display </H3><BODY><HTML>" from the received Web page generation program (Step S3).

Then, the characteristic information generation module 242 couples the static information items (1) to (3) extracted at Step S3, and generates first static characteristic information "736c475c1a0675751106b8caa6179fdbdd95e013", based on
the coupled static information "<HTML><BODY><H3> Calculation result:</H3><H3> End display </H3><BODY><HTML>" and the hash function (Step S4).

Thereafter, the characteristic information generation module 242 writes identification information for identifying the HTML information ht generated from the Web page generation program pr, the dynamic characteristic information that has been generated at Step S2, and the first static characteristic information that has been generated at Step S4, in the characteristic information storage module 241. The characteristic information generation module 242 also writes the Web page generation program pr received at Step S1 in the program storage module 21 in the Web server device 2 (Step S5).

Then, when the falsification checking module 243 receives the HTML information ht for displaying the generated Web page in response to a Web page obtaining request from the user terminal 3 from the application logic module 23, the falsification checking module 243 extracts the dynamic information "abcd" in the HTML information ht, as illustrated in FIG. 8 (Step S6).

Thereafter, the falsification checking module 243 determines whether the dynamic information extracted at Step S6 corresponds to the dynamic characteristic information stored in the characteristic information storage module 241 (Step S7).

When a result of determination of Step S7 indicates that they do not correspond (Step S7: No correspond), the system goes to the processing of Step S11. On the other hand, when the result of determination of Step S7 indicates that they correspond (Step S7:Correspond), the falsification checking module 243 extracts static information items: (4) "<HTML><BODY><H3> Calculation result:"; and (5) "</H3><H3> End display </H3></BODY></HTML>", other than the dynamic information (the line "abcd" in the example of FIG. 8) and the comment information (the line with the head "<!" in the example of FIG. 8), in the HTML information ht received from the application logic module 23 (Step S8).

Then, the falsification checking module 243 couples the static information items extracted at Step S8, and generates second static characteristic information, based on the coupled static information and the hash function (Step S9).

Next, the falsification checking module 243 compares the first static characteristic information stored in the characteristic information storage module 241 with the second static characteristic information generated at Step S9, and thereby determines whether the second static characteristic information matches with the first static characteristic information (Step S10).

When a result of determination of Step S10 indicates that they do not match (Step S10: No match), the falsification checking module 243 reads the HTML information for displaying an error picture stored in the information storage module 22 through the application logic module 23, transmits the read HTML information to the user terminal 3 (Step S11), and ends the falsification checking operation in the Web page falsification detection device 24.

On the other hand, when the result of determination of Step S10 indicates that they match (Step S10: Match), the falsification checking module 243 determines that the HTML information ht received from the application logic module 23 is not falsified information, and transmits the HTML information ht to the user terminal 3 (Step S12).

Although falsification checking processing is executed for Web page information in which dynamic information and static information is embedded in the present embodiment, falsification checking processing may be executed for Web page information in which only static information is embedded, or Web page information in which only dynamic information and comment information including dynamic characteristic information are embedded.

In addition, although the characteristic information generation module 242 performs processing of writing the dynamic characteristic information and static characteristic information in the characteristic information storage module 241 in the present embodiment, the writing processing may be executed by an operator who operates the Web page falsification detection apparatus 24. In the same manner, although the characteristic information generation module 242 executes processing of writing the Web page generation program pr in the program storage module 21 in the Web server device 2, the writing processing may be executed by the operator who operates the Web page falsification detection apparatus 24.

Besides, although the present embodiment shows the case where the dynamically changing parts (x) and (s) are an integer or a character string as illustrated in FIG. 3 and FIG. 7, the falsification checking processing may be executed for the Web page information generated by the Web page generation program pr in the case where the dynamically changing parts are a fraction, a decimal, or a script.

Falsification detection using a Web filter can be performed, by preparing a Web filter having the function of the above falsification checking module 243 and setting dynamic characteristic information and static characteristic information as filtering rules of the Web filter.

According to the present embodiment explained above, the system includes the dynamic information falsification determination function using the dynamic characteristic information and the static information falsification determination function using the static characteristic information, and thereby it can detect not only static Web-page falsification but also dynamic Web-page falsification with small change.

The method described in the above embodiment may be stored and distributed in a storage medium such as a magnetic disk (such as a floppy [registered trademark] disk and a hard disk), an optical disk (such as a CD-ROM and a DVD), a magneto-optical (MO) disk, and a semiconductor memory, as a program which can be executed by a computer.

The storage medium may adopt any storage form, as long as it is a computer-readable storage medium which is capable of storing a program.

Part of the processing to carry out the above embodiment may be executed by an operating system (OS) which operates on the computer, or middleware (MW) such as database management software and network software, based on instructions of the program installed from the storage medium in the computer.

In addition, the storage medium in the embodiment is not limited to a medium independent of the computer, but also includes a storage medium which stores or temporarily stores a program downloaded over a LAN or the Internet.

The storage medium in the present invention is not limited to one. The present invention also includes the case where the processing in the embodiment is executed by using a plurality of storage media, and the storage medium may have either of the structures.

The computer in the embodiment executes the processing in the above embodiment, based on the program stored in a storage medium, and may be an apparatus such as a personal computer, or a system obtained by connecting a plurality of apparatuses through a network.

In addition, the computer in the embodiment is not limited to a personal computer, but also includes a processing unit or a microcomputer included in an information processing apparatus. The term "computer" in the embodiment is a general term for apparatuses and devices which are capable of achieving the function of the present invention by the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A Web page falsification detection apparatus provided in a Web server device including an application logic module capable of communicating with a user terminal which displays a Web page, the Web page falsification detection apparatus including a characteristic information storage module, being capable of communicating with a manager terminal, and executing falsification checking processing for Web page information to display the Web page on the user terminal, the Web page falsification detection apparatus comprising:

a first extraction module which receives a Web page generation program configured to generate the Web page information and including a dynamic information calculation program configured to calculate dynamic information to display a changed part in the Web page, comment information including dynamic characteristic information indicating a characteristic including a range of change of the dynamic information, and a plurality of static information items to display an unchanged part in the Web page, and extracts the comment information from the received Web page generation program;

a dynamic characteristic information extraction module which extracts the dynamic characteristic information from the extracted comment information;

a second extraction module which extracts the static information items from the received Web page generation program;

a first generation module which couples the extracted static information items, and generates first static characteristic information that indicates a characteristic of the static information, based on the coupled static information and function information that indicates a predetermined unidirectional function;

a first writing module which correlates identification information for identifying the Web page information, the extracted dynamic characteristic information, and the generated first static characteristic information, and writes the correlated information items in the characteristic information storage module;

a second writing module which writes the received Web page generation program in a storage module in the Web server device;

a third extraction module which extracts the dynamic information from Web page information transmitted from the application logic module, the Web page information being generated from the Web page generation program in the storage module by the application logic module which has received a Web page obtaining request from the user terminal, and including the dynamic information, the comment information, and the static information items;

a dynamic information falsification determination module which reads the extracted dynamic characteristic information from the characteristic information storage module based on the identification information for identifying the Web page information generated by the application logic module, and determines whether the extracted dynamic information corresponds to the dynamic characteristic information read from the characteristic information storage module;

a fourth extraction module which extracts the static information items from the transmitted Web page information, when a result of determination by the dynamic information falsification determination module indicates that the dynamic information corresponds to the dynamic characteristic information;

a second generation module which couples the extracted static information items, and generates second static characteristic information that indicates a characteristic of the coupled static information, based on the coupled static information and the function information;

a static information falsification determination module which determines whether the first static characteristic information stored in the characteristic information storage module matches with the generated second static characteristic information; and a transmission module which transmits the transmitted Web page information to the user terminal, when a result of determination by the static information falsification determination module indicates that the first static characteristic information matches with the generated second static characteristic information.

2. The Web page falsification detection apparatus according to claim 1, wherein the comment information includes information which includes a maximum value and a minimum value of the change of the dynamic information, and the dynamic characteristic information extraction module includes a fifth extraction module which extracts the information including the maximum value and the minimum value of the change of the dynamic information from the comment information, as the dynamic characteristic information.

3. A non-transitory computer-readable storage medium which stores a program executed by a processor of a Web page falsification detection apparatus provided in a Web server device including an application logic module capable of communicating with a user terminal which displays a Web page, the Web page falsification detection apparatus including a characteristic information storage module, being capable of communicating with a manager terminal, and executing falsification checking processing for Web page information to display the Web page on the user terminal, the program comprising:

first program code which causes the processor to execute first extraction processing of extracting comment information from a Web page generation program received from the manager terminal, the Web page generation program configured to generate the Web page information and including a dynamic information calculation program configured to calculate dynamic information to display a changed part in the Web page, the comment information, and a plurality of static information items to display an unchanged part in the Web page, the comment information including dynamic characteristic information indicating a characteristic including a range of change of the dynamic information;

second program code which causes the processor to execute dynamic characteristic information extraction processing of extracting the dynamic characteristic information from the extracted comment information;

third program code which causes the processor to execute second extraction processing of extracting the static information items from the received Web page generation program;

fourth program code which causes the processor to execute first generation processing of coupling the extracted static information items, and generating first static characteristic information that indicates a characteristic of the static information, based on the coupled static information and function information that indicates a predetermined unidirectional function;

fifth program code which causes the processor to execute first writing processing of correlating identification information for identifying the Web page information, the extracted dynamic characteristic information, and the generated first static characteristic information, and writing the correlated information items in the characteristic information storage module;

sixth program code which causes the processor to execute second writing processing of writing the received Web page generation program in a storage module in the Web server device;

seventh program code which causes the processor to execute third extraction processing of extracting the dynamic information from Web page information transmitted from the application logic module, the Web page information being generated from the Web page generation program in the storage module by the application logic module which has received a Web page obtaining request from the user terminal, and including the dynamic information, the comment information, and the static information items;

eighth program code which causes the processor to execute dynamic information falsification determination processing of reading the extracted dynamic characteristic information from the characteristic information storage module based on the identification information for identifying the Web page information generated by the application logic module, and determining whether the extracted dynamic information corresponds to the dynamic characteristic information stored in read from the characteristic information storage module;

ninth program code which causes the processor to execute fourth extraction processing of extracting the static information items from the transmitted Web page information, when a result of determination in the dynamic information falsification determination processing indicates that the dynamic information corresponds to the dynamic characteristic information;

tenth program code which causes the processor to execute second generation processing of coupling the extracted static information items, and generating second static characteristic information that indicates a characteristic of the coupled static information, based on the coupled static information and the function information;

eleventh program code which causes the processor to execute static information falsification determination processing of determining whether the first static characteristic information stored in the characteristic information storage module matches with the generated second static characteristic information; and twelfth program code which causes the processor to execute transmission processing of transmitting the transmitted Web page information to the user terminal, when a result of determination in the static information falsification determination processing indicates that the first static characteristic information matches with the generated second static characteristic information.

* * * * *